United States Patent Office 3,755,541
Patented Aug. 28, 1973

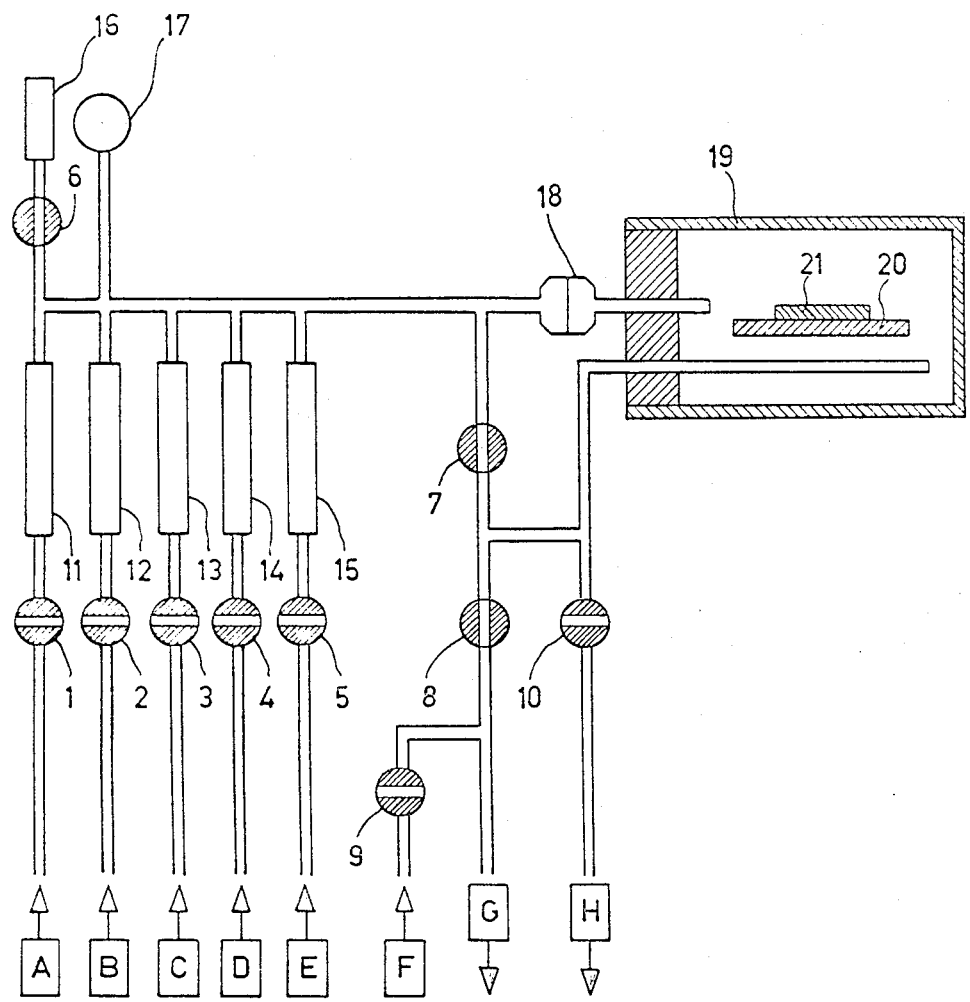

3,755,541
METHOD AND DEVICE FOR MANUFACTURING SILICON CARBIDE
Serge Strepkoff, Caen, France, assignor to U.S. Philips Corporation, New York, N.Y.
Filed Oct. 22, 1968, Ser. No. 769,481
Claims priority, application France, Oct. 23, 1967, 125,392
Int. Cl. C01b 31/36; C01j 1/14
U.S. Cl. 423—346                                 6 Claims

ABSTRACT OF THE DISCLOSURE

A method of manufacturing silicon carbide by decomposition of a gas mixture containing a hydrocarbon compound, e.g. propane, a silane, e.g. $SiH_4$, a carrier gas, e.g. hydrogen, and hydrogen chloride. The concentration of silicon atoms in the mixture is chosen to be between 10 to 50% of the concentration of the carbon atoms.

---

This invention relates to a method of manufacturing crystalline silicon carbide by decomposition of a gas mixture containing a hydrocarbon compound, a silane and a carrier gas.

Such methods are known in which the carbon and silicon compounds employed are more particularly the hydrocarbons and their halogen compounds, i.e. silane $SiH_4$ and its halogen compounds, for example, $SiCl_4$.

However, it is very difficult to obtain the required amounts of active materials simultaneously.

In German patent specification No. 1,215,665 it is stated that hydrocarbons are decomposed more readily than silicon tetrachloride $SiCl_4$ at comparatively high temperatures. Consequently graphite occlusions occur in the silicon carbide if, for example, a hydrocarbon and silicon tetrachloride are mixed in equal ratios. In order to avoid this difficulty, it is suggested in the said patent specification to admit the gases to a reaction space at a rate of flow such that the number of silicon atoms is from 5 to 100 times greater than the number of carbon atoms.

If silane, $SiH_4$, is used instead of silicon tetrachloride (see, for example, British patent specification No. 1,039,748) one is confronted with the opposite problem. In fact, silane is dissociated more readily than hydrocarbons and homogeneous nuclear formation gives rise to silicon particles which are very troublesome since they deposit on a layer, for example, during the formation thereof, resulting in occlusions.

An object of the invention is inter alia to obviate these disadvantages. The method mentioned in the preamble is characterized in that a halogen hydrogen acid is added to the said mixture. Preferably hydrochloric acid is used as the halogen hydrogen acid.

Tests have revealed that the said acid stabilizes the reaction and counteracts the formation of silicon particles in the gaseous phase. By the use of this acid it is possible to obtain compact and homogeneous silicon carbide monocrystals. Preferably, the hydrocarbon compound used is silane, and the carrier used is hydrogen.

The present invention also relates to preferred compositions of the mixture employed, the concentration of silicon atoms in the gas mixture being between 50% and 10% of the concentration of carbon atoms. Furthermore, if hydrogen is used as the carrier gas, the concentration of hydrochloric acid is adjusted by a factor of 2 to 10 times higher than that of silane $SiH_4$.

The invention more particularly relates to a mixture of silane, $SiH_4$, propane, $C_3H_8$, hydrochloric acid HCl and hydrogen, in which, if the concentration of silane is represented by 1, that of propane is represented by 3, that of hydrochloric acid by 4, and that of hydrogen by 10000.

With such a mixture it is possible to work at a temperature of 1200°C. and to obtain on a selected carrier beautiful, compact and homogeneous silicon carbide crystals ($\beta$) which are monocrystalline if the carrier is a monocrystal, for example, a silicon carbide monocrystal.

It should be noted that the hydrochloric acid in the said mixture plays a part which is quite different from that mentioned in the German patent specification where it is represented as a carrier gas. Since the mixtures specified in the said German patent specification differ from those of the present patent application, the hydrochloric acid cannot play an active part and is solely used as a carrier gas, since it does not take part in any of the reactions cited in the examples given.

It appears that the moderating action of hydrochloric acid in a mixture according to the invention may be explained in the manner described hereinafter, but this explanation is not bound to the present invention and in fact independent thereof.

Thermal dissociating reactions of hydrocarbons are known and will be mentioned only pro memoria with propane as an example.

$$C_2H_8 \rightleftharpoons CH_3 + C_2H_5 \tag{1}$$

$$CH_3 \rightleftharpoons C + 3H \tag{2}$$

The radical $C_2H_5$ is decomposed a second time in ethylene and hydrogen according to the reaction:

$$C_2H_5 \rightarrow C_2H_4 + H \tag{3}$$

The ethylene remains unused, since it is not decomposed. Among the three carbon atoms of the propane molecule only one can be regarded as active during the reaction for the formation of SiC.

The thermal dissociating reactions of the silane SiH are also known.

$$SiH_4 \rightleftharpoons SiH_2 + H_2 \rightleftharpoons Si + 2H_2 \tag{4}$$

The rate of reaction depends on the carrier gas. If hydrogen is used as the carrier gas, it decelerates the reaction in accordance with the law of mass action. If another preferred embodiment of the method according to the invention utilises a carrier gas other than hydrogen, for example argon, either the concentration of silane must for this reason be considerably reduced, preferably by a factor of 10, or the concentration of hydrochloric acid must be increased, since the stabilizing action of hydrogen is no longer exerted.

Known also is the reaction between silane and hydrochloric acid:

$$SiH_4 + 4HCl \rightleftharpoons SiCl_4 + 4H_2 \tag{5}$$

and the dissociation reaction of tetrachlorosilane $SiCl_4$:

$$SiCl_4 + 2H_2 \rightleftharpoons Si + 4HCl \tag{6}$$

If the Reaction 5 takes place in the same temperature range as the Reaction 4 it is known that the Reaction 6 can take place at a considerable speed in the direction of the dissociation of $SiCl_4$ (from left to right) solely in a range of higher temperatures (from 1300° C.) whereas at 1200° C. it takes place from right to left so that the excessive silicon can be eliminated. The gas mixture is preferably decomposed at a temperature between 1100° C. and 1300° C. These reactions thus determine almost completely the amount of silicon that is set free.

In order that the invention may be readily carried into effect it will now be described in detail, by way of example, with reference to the accompanying diagrammatic drawing showing the device for carrying out the method according thereto.

This device comprises a supply unit which provides the various gases required for the method, such as hydrogen at A, nitrogen at B, silane at C, propane at D, and hydrochloric acid at E. These gases are admitted through cocks 1, 2, 3, 4 and 5 and their rate of flow is checked on flow meters 11, 12, 13, 14 and 15. The device includes an auxiliary unit by which either air may be admitted to the system at F by opening cocks 8 and 9 or the system may be exhausted by means of a pump (not shown), connected at G, by opening cocks 6, 7 and 8, the pressure being read on a Bourdon pressure gauge 17, or by which the gases passing towards a burner (not shown), connected at H, may be allowed to escape through a cock 10.

Since the purity of the gases employed determines the purity of the deposit, it is necessary to place a filter 18 in front of the input of a reaction vessel 19. This reaction vessel, which is made of quartz, is closed hermetically and contains a heating carrier 20 and a substrate 21, on which an SiC-layer must be formed.

This device is simple in use. After all cocks, except 6, 7 and 8, have been closed (position shown in the drawing) the plant is exhausted by means of the pump at G. As soon as the desired pressure, for example $10^{-2}$ torr, which can be read on pressure gauges 16 and 17 is reached, the cocks 6, 7 and 8 are closed and the cock 2 is opened to admit nitrogen to the system at B, whereupon cock 10 is opened as soon as the nitrogen pressure slightly exceeds the atmospheric pressure. The last-mentioned gas plays no part in the reactions and is used solely to avoid explosion during the subsequent treatment in which the plant is purified with the aid of hydrogen which is admitted at A by opening cock 1 after closing cock 2. The substrate is heated to and maintained at a temperature between 1100° C. and 1300° C. and the gases $SiH_4$, $C_3H_8$ and HCl are admitted simultaneously or not, dependent on the substrate chosen, by opening the cocks 3, 4 and 5, hydrogen serving as the carrier gas. The ratios between these various gases depend on the temperature chosen. If there is worked at a temperature of, for example, 1200° C. and if the rate of flow of the silane is taken as a reference and given the arbitrary value unity, that of the propane must be represented by 3, that of the hydrochloric acid by 4 and that of the hydrogen by 1000. When the deposit has reached the desired thickness, the cocks 3, 4 and 5 are closed, the system is purified with the aid of hydrogen and the substrate is cooled down. Prior to cooling, the deposited layer may, if desired, be strongly heated. As soon as the filtrate has sufficiently cooled down, nitrogen is admitted by opening the cock 2 after cock 1 has been closed. Ultimately the cock 2 is closed and the reaction vessel opened by admitting air through the cocks 8 and 9.

It will be evident that the invention is not restricted to the method given by way of example, many variations being possible within the scope of the invention.

What is claimed is:

1. A method of manufacturing crystalline silicon carbide comprising the steps of forming a gas mixture consisting essentially of propane, a silane, a carrier gas, and hydrogen chloride, in amounts at which the concentration of silicon atoms in the mixture is between 10 and 50% of the concentration of carbon atoms, and heating said gas mixture to a temperature between 1100° and 1300° C. to react the constituents thereof and form silicon carbide.

2. A method as claimed in claim 1, wherein the silane is monosilane, $SiH_4$.

3. A method as claimed in claim 2 wherein the carrier gas is hydrogen.

4. A method as claimed in claim 3, wherein the concentration of the hydrochloric acid is by a factor of 2 to 10 times higher than that of silane.

5. A method as claimed in claim 1 wherein the carrier gas is argon.

6. A method as claimed in claim 5 wherein the concentration of the hydrochloric acid is from 20 to 100 times higher than that of silane.

References Cited

UNITED STATES PATENTS

| | | | |
|---|---|---|---|
| 3,371,995 | 3/1968 | Pultz | 23—208 A |
| 3,382,113 | 5/1968 | Ebert et al. | 423—346 X |
| 3,386,866 | 6/1968 | Ebert et al. | 23—208 A |
| 3,099,534 | 7/1963 | Schweikert et al. | 23—208 A |
| 3,511,702 | 5/1970 | Jackson, Jr., et al. | 117—106 A |

FOREIGN PATENTS

| | | | |
|---|---|---|---|
| 1,184,739 | 1/1965 | Germany | 23—208 A |
| 1,029,473 | 5/1966 | Great Britain | 23—208 A |

MILTON WEISSMAN, Primary Examiner

U.S. Cl. X.R.

117—106

PO-1050
(5/69)

UNITED STATES PATENT OFFICE
CERTIFICATE OF CORRECTION

Patent No. 3755541      Dated August 28, 1973

Inventor(s) SERGE STREPKOFF

It is certified that error appears in the above-identified patent and that said Letters Patent are hereby corrected as shown below:

Column I, lines 60-61, before "silane" insert --propane, the hydrosilicon compound used is--.
Column II, line 2, "10000" should be --1000--.
Column II, line 25, that portion of the formula reading "$C_2H_8$" should be --$C_3H_8$--.

Signed and sealed this 7th day of May 1974.

(SEAL)
Attest:

EDWARD M. FLETCHER, JR.
Attesting Officer

C. MARSHALL DANN
Commissioner of Patents